Figure 1:
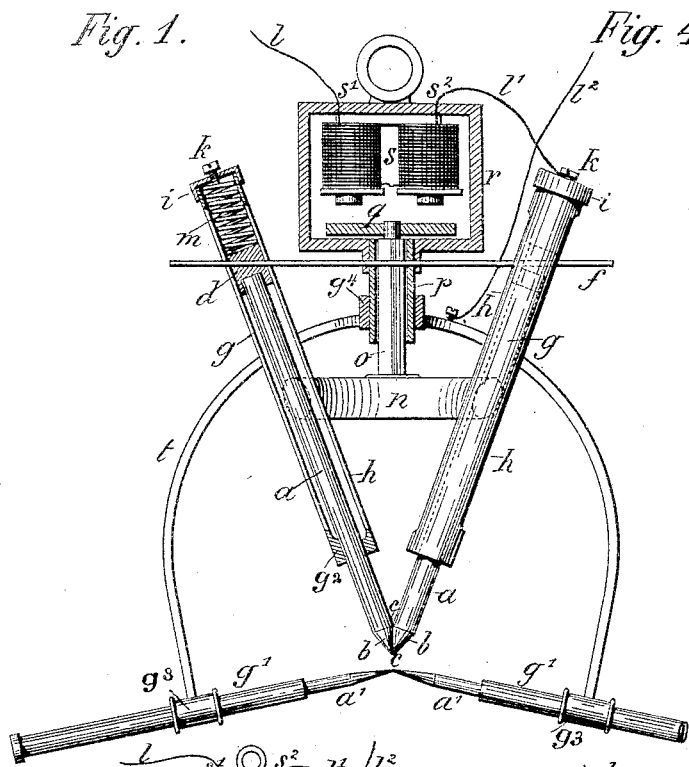

(No Model.)

K. KURMAYER.
ELECTRIC ARC LAMP.

No. 448,351. Patented Mar. 17, 1891.

Witnesses:

Inventor:
Karl Kurmayer

UNITED STATES PATENT OFFICE.

KARL KURMAYER, OF VIENNA, AUSTRIA-HUNGARY.

ELECTRIC-ARC LAMP.

SPECIFICATION forming part of Letters Patent No. 448,351, dated March 17, 1891.

Application filed September 15, 1890. Serial No. 365,043. (No model.)

*To all whom it may concern:*

Be it known that I, KARL KURMAYER, a subject of the Emperor of Austria, residing at Vienna, in the Province of Lower Austria, in the Empire of Austria-Hungary, have invented certain new and useful Improvements in Electric-Arc Lamps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention relates to electric-arc lamps or lights, and more especially to the feeding of the carbon electrodes and to the positioning of said electrodes for determining the length of the arc.

It is well known that in the combustion of the carbons of arc lamps or lights, the ends between which the electric arc is formed or produced have the general tendency to assume a conoidal form irrespective of the inward consumption, resulting in a conoidal hollow or hollowing out of the end or point of the positive electrode. It is further well known that this tendency to a conoidal formation results in cone-points that are more or less acute according to the tension of the current and the diameter of the carbons. It is also well known that the variations in the length of the arc, consequently the variations in the intensity of the light, are due in a great measure to variations in the feeding of the carbon—that is to say, to the variations in their motion toward each other in proportion to the combustion.

The invention has for its object to provide means for synchronizing the movement of the carbons in those lamps or lights in which the electrodes are composed of two carbons, to provide means for determining either positively or electrically, or both, the relative position of the electrodes for the purpose of determining the length of the arc, and for the purpose of obtaining an invariable arc when its length has been determined.

The further object of my invention is to provide devices for determining the position of one of the electrodes relatively to the position of the other electrode, either positively or electrically or both, and means for adjusting the said devices so that the distance between the electrodes can be controlled, and consequently the length of the arc varied.

The invention consists in means for synchronizing the movements of the carbons of an electrode in those lamps in which each electrode is composed of a pair of carbons, in means for regulating and determining the length of the arc, either positively or electrically or both, and in structural features and combinations of parts, as will now be fully described, reference being had to the drawing hereto annexed, in which—

Figure 4:
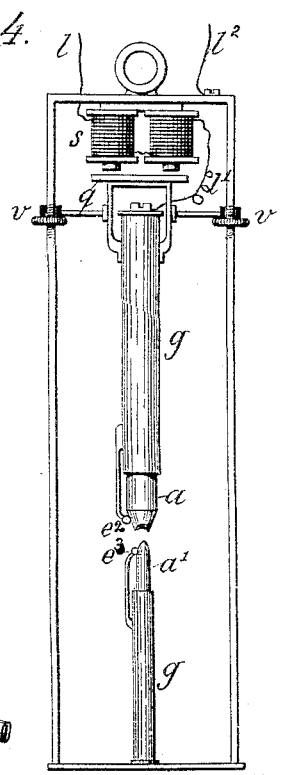
Figure 2:
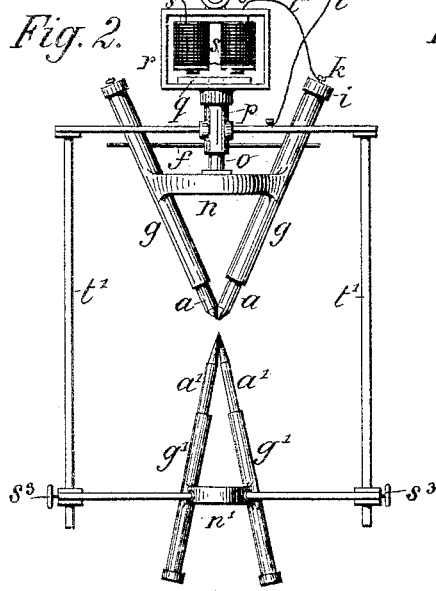
Figure 3:
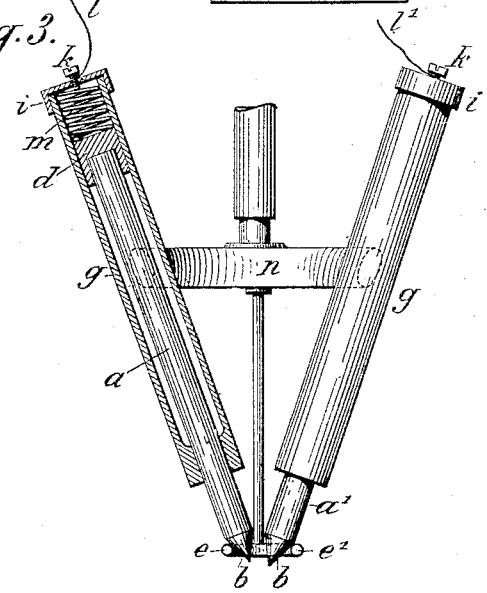

Figure 1 is a sectional elevation, and Fig. 2 an elevation of an arc light or lamp in which the electrodes are composed of two converging carbons. Fig. 3 is a like view of a lamp in which the electrodes are arranged to converge, and Fig. 4 is also an elevation of an arc light or lamp in which the electrodes are arranged in the same axial plane.

Referring to Figs. 1 and 2, the carbons $a\ a$, that constitute the upper or positive electrode, are arranged in inclined planes in accordance with the cones formed during combustion at the ends of the carbons, so that when the cone ends $b\ b$ of said carbons are brought in contact along the generatrix $c\ c$ they will form an angle whose vertex is formed by said cones. In this manner the carbons themselves form abutments for each other that serve to limit their movement, so that the cone ends will always be in a constant plane or zone, the carbons having a tendency to continuous downward motion either by gravity or under the stress of a spring, or both. The length of the arc will therefore be constant when the negative carbons $a'\ a'$ are similarly arranged, whether the angle formed by said negative carbons is an obtuse one, as shown in Fig. 1, or an acute one, as shown in Fig. 2.

In order to avoid variation in the relative movements of the two carbons or at least one pair of such, I provide means for synchronizing their movements toward each other as combustion takes place, and this may be attained by coupling the same in any desired manner.

In Figs. 1 and 2 I have shown a simple means for coupling the carbons of a pair, and, as shown in Fig. 1, the carbons are each contained in a holder or guide-tube $g$ of greater diameter than the carbon $a$, except at the lower end, where said holder is provided with a bearing $g^2$ of substantially the same diameter, while the carbon itself is secured in a cylindrical block or shoe $d$, that fits the tube snugly, so that both ends of the carbon are supported in and guided by bearings. The carbons $a$ move in their tubes by gravity; but as they move in frictional contact with the tube $g$, I prefer to employ a coiled spring $m$ of such tension as to overcome the frictional resistance to the gravitation of the carbon with and in its bearings. As shown in Fig. 1, the spring is arranged in the tube above the shoe or block, and bears upon it and against a screw-cap $i$, that is provided with a binding-screw $k$.

To cause the two carbons to move synchronously, I couple the same by means of a rod or wire $f$, that passes loosely through a perforation in the block and through longitudinal slots $h$ in the tubes. The two tubes are secured to the arms of a bracket $n$, secured to a spindle or stem $o$, that has free vertical motion in a tubular extension $p$, depending from a support $r$, the spindle $o$ or said spindle and extension $p$ being so constructed that said spindle cannot revolve in its bearings. At its upper end the spindle carries an armature $q$, that limits the downward movement of the carbon-support $n$, or its movement toward the negative electrode, and in the supporting-frame $r$ is arranged an electro-magnet $s$, that is interposed in the line-circuit and that when the current is on serves to determine the distance between the positive and negative electrodes, consequently the length of the arc, and these devices I call the "spacing" devices for the electrodes. The two carbons $a'$ $a'$, that constitute the negative electrode, are also contained in guide-tubes $g'$, of substantially the same construction as those for the positive carbons $a$ $a$; but the blocks or bearings $d$ and the coupling-rod $r$ are or may be dispensed with, and said negative carbons are impelled by springs. The tubes $g'$ $g'$ are held in bearing-sleeves $g^3$, secured to the ends of curved arms $t$, projecting from a sleeve $g^4$, secured to but insulated from the tubular extension $p$, and one of the arms $t$ is provided with a binding-screw. The current passes from line by wire $l$ to the bobbin $s'$ of the electro-magnet $s$, thence through bobbin $s^2$ of said electro-magnet, and by wire $l'$ to one of the carbon-holders, through the carbons $a$ $a$ and $a'$ $a'$, bracket-arm $t$ to wire $l^2$, and thence to line. As soon as the current is turned on the electro-magnet $s$ will attract the armature $q$, lifting the upper carbons $a$ $a$, and thus determining the length of the arc between the points of the two pair of carbons.

When two carbons are used for each electrode, the lower or negative carbons are usually of less diameter than the upper or positive carbons, and according to the particular uses made of the lamp, the intensity of the light, and the nature of the carbons the said lower or negative carbons may be arranged at a very obtuse angle, as shown in Fig. 1, to allow of downward radiation of the light; or they may be arranged at an acute angle, as shown in Fig. 2, so as to admit of lateral radiation, which is especially desirable for outdoor illumination. In this case the holders for the carbons $a'$ $a'$ of the negative electrode are supported by a horizontal rod that is adjustable by means of set-screws $s^3$ on the vertical arms $t'$ of a frame whose upper cross-bar is secured to a sleeve mounted on and insulated from the tubular extension $p$ of the support; or the said cross-bars may be secured to said tubular extension and insulated therefrom; or the said tubular extension may be constructed of an insulating material, which in either of the arrangements shown in Figs. 1 and 2 will be the simplest.

In those lamps in which the electrodes are arranged so as to throw as large an amount of light downwardly as possible the electro-magnet is dispensed with, a fixed abutment being provided, against which the carbons bear, as shown in Fig. 3, in which the carbon electrodes $a$ $a'$ are so arranged as to converge, the limit of approachment of the carbon points being determined by curved abutment-arms $e$ $e'$, of a material capable of withstanding the heat, and secured to a rod depending from the support $n$ for the carbon-holders. In this construction the said holders are interposed in the line-circuit and the controlling electro-magnet is dispensed with, as will be readily understood.

In arc lights in which the positive and negative carbons are arranged in the same axial plane I provide abutments, preferably in the form of a small sphere $e^2$ $e^3$, at the end of said rod secured to the carbon-holder, as shown in Fig. 4, said sphere having bearing on the cone-point of the carbon. Although this form of abutment is preferred, I do not desire to limit myself thereto, as it may be of any other desired form. These abutments are also made of a material capable of resisting the heat, and as they do not determine the length of the arc the upper carbon-holder is provided with an armature $q$, and an electro-magnet $s$ is secured to the upper cross-bar of the lamp-frame. In this case the length of the arc is adjustable. As shown, the upper carbon-holder is supported by arms extending laterally from a frame that carries the armature $q$, said frame being constructed of an insulating material, and said arms terminating in sleeves or collars, through which the vertical bars of the frame pass loosely, and said cross-bars have bearing upon nuts $v$, that work on screw-threaded portions of said vertical frame bars or rods.

It is obvious that similar or equivalent means of adjustment may be provided for lamps of the construction shown in Figs. 1 and 2 by any skilled mechanic conversant with the means described, so that I have deemed it unnecessary to illustrate the same in their application to lamps of the construction shown in said Figs. 1 and 2.

The described forms of arc lights may be operated either with a continuous or with an alternating current to any desired intensity of light, the luminous zone remaining invariable, and these lights may be used for all purposes of illumination.

Having thus described my invention, what I claim is—

1. In an arc lamp, the combination of converging and longitudinally-slotted carbon-holders, a movable bearing in each of said holders, to which bearing the pencil is secured, and a coupling-rod extending loosely through the said bearings, for the purpose set forth.

2. In an arc light, the combination of two converging carbon-holders and spring-supports therefor tending to move the holders toward each other, of converging and longitudinally-slotted carbon-holders, a gravital bearing contained therein, to which the pencil is secured, and a coupling-rod extending loosely through said bearings, for the purpose set forth.

3. In an electric-arc lamp, the combination of converging carbon-holders, spring-supports therefor tending to move the holders toward each other and constituting the support for one of the electrodes, a support for the other electrode, composed of converging longitudinally-slotted and vertically-movable holders, a gravital bearing to which the pencil is secured, contained in each of said holders, and a coupling-rod extending loosely through said bearings, of electrically-controlled devices, such as described, for automatically varying the position of one pair of carbon-holders relatively to the other pair, for the purpose set forth.

4. In an arc light, the combination of two carbon-holders $g$, provided on opposite sides with longitudinal slots and with a bearing $g^2$, a carbon pencil $a$ for each of said holders, and a bearing $d$, to which one end of the pencil is secured, said bearing having a motion within the holder, of a coupling consisting of a rod extending loosely through perforations in the bearing $d$, substantially as and for the purposes set forth.

In testimony whereof I affix my signature in presence of two witnesses.

KARL KURMAYER.

Witnesses:
JULIUS GOLDSCHMIDT,
W. B. MURPHY.